(12) United States Patent
Zielinski et al.

(10) Patent No.: US 10,306,650 B2
(45) Date of Patent: May 28, 2019

(54) DEVICE, METHOD AND COMPUTER PROGRAM FOR CHARACTERIZING ANTENNA UNITS IN A PREDEFINED SPACE

(71) Applicant: VOLKSWAGEN AG, Wolfsburg (DE)

(72) Inventors: Ernst Zielinski, Bochum (DE);
Matthias Mohaupt, Bochum (DE);
Jens Kampermann, Haan (DE);
Wolfgang Theimer, Bochum (DE)

(73) Assignee: Volkswagen AG (DE)

( * ) Notice: Subject to any disclaimer, the term of this patent is extended or adjusted under 35 U.S.C. 154(b) by 0 days.

(21) Appl. No.: 15/659,856

(22) Filed: Jul. 26, 2017

(65) Prior Publication Data
US 2018/0035433 A1    Feb. 1, 2018

(30) Foreign Application Priority Data

Jul. 26, 2016    (DE) .................... 10 2016 213 689

(51) Int. Cl.
| | | |
|---|---|---|
| *H04W 72/08* | (2009.01) | |
| *H01Q 1/32* | (2006.01) | |
| *H04B 7/024* | (2017.01) | |
| *H04W 8/08* | (2009.01) | |
| *H01Q 3/38* | (2006.01) | |
| *H04B 17/12* | (2015.01) | |
| *H04B 17/10* | (2015.01) | |
| *H04W 72/04* | (2009.01) | |
| *H04B 17/19* | (2015.01) | |
| *H04B 17/27* | (2015.01) | |
| *H04B 17/318* | (2015.01) | |

(52) U.S. Cl.
CPC ............ *H04W 72/08* (2013.01); *H01Q 1/325* (2013.01); *H01Q 1/3275* (2013.01); *H01Q 3/38* (2013.01); *H04B 7/024* (2013.01); *H04B 17/102* (2015.01); *H04B 17/12* (2015.01); *H04W 8/08* (2013.01); *H04W 72/087* (2013.01); *H04B 17/19* (2015.01); *H04B 17/27* (2015.01); *H04B 17/318* (2015.01); *H04W 72/04* (2013.01)

(58) Field of Classification Search
CPC ...................................................... H04B 17/27
See application file for complete search history.

(56) References Cited

U.S. PATENT DOCUMENTS

| | | | |
|---|---|---|---|
| 2003/0209893 A1 | 11/2003 | Breed et al. | |
| 2008/0225960 A1* | 9/2008 | Kotecha | ............ H04B 7/0413 375/259 |

(Continued)

*Primary Examiner* — Hsinchun Liao
(74) *Attorney, Agent, or Firm* — Barnes & Thornburg LLP

(57) ABSTRACT

An apparatus, a method and a computer program for characterizing antenna units in a predefined space. The antenna units provide coverage with radio services for a mobile transceiver in the space. An antenna unit is operated in two modes of operation, sending and receiving. At least one first antenna unit has multiple radiation characteristics. The method includes operating the first antenna unit in a first mode of operation and operating a second antenna unit in the second mode of operation and varying the radiation characteristics of the first antenna unit and capturing information about transmission properties between the first antenna unit and the second antenna unit for the radiation characteristics. The method also includes characterizing the antenna units based on the information about the transmission properties.

48 Claims, 11 Drawing Sheets

(56) References Cited

U.S. PATENT DOCUMENTS

2011/0267186 A1* 11/2011 Rao ................. B60K 28/08
340/449
2016/0165548 A1 6/2016 Mohlmann et al.
2017/0105101 A1* 4/2017 Santavicca ............ H04B 17/27

* cited by examiner

DEVICE, METHOD AND COMPUTER PROGRAM FOR CHARACTERIZING ANTENNA UNITS IN A PREDEFINED SPACE

PRIORITY CLAIM

This patent application claims priority to German Patent Application No. 10 2016 213 689.5, filed 26 Jul. 2016, the disclosure of which is incorporated herein by reference in its entirety.

SUMMARY

Illustrative embodiments relate to an apparatus, a method and a computer program for characterizing antenna units in a predefined space, in particular, but not exclusively, to the characterization of multiple antenna units in a vehicle interior.

BRIEF DESCRIPTION OF THE DRAWINGS

Further embodiments are described in more detail below based on the drawings, to which, however, exemplary embodiments generally are not restricted overall. In the drawings.

DETAILED DESCRIPTION

Figure 1:
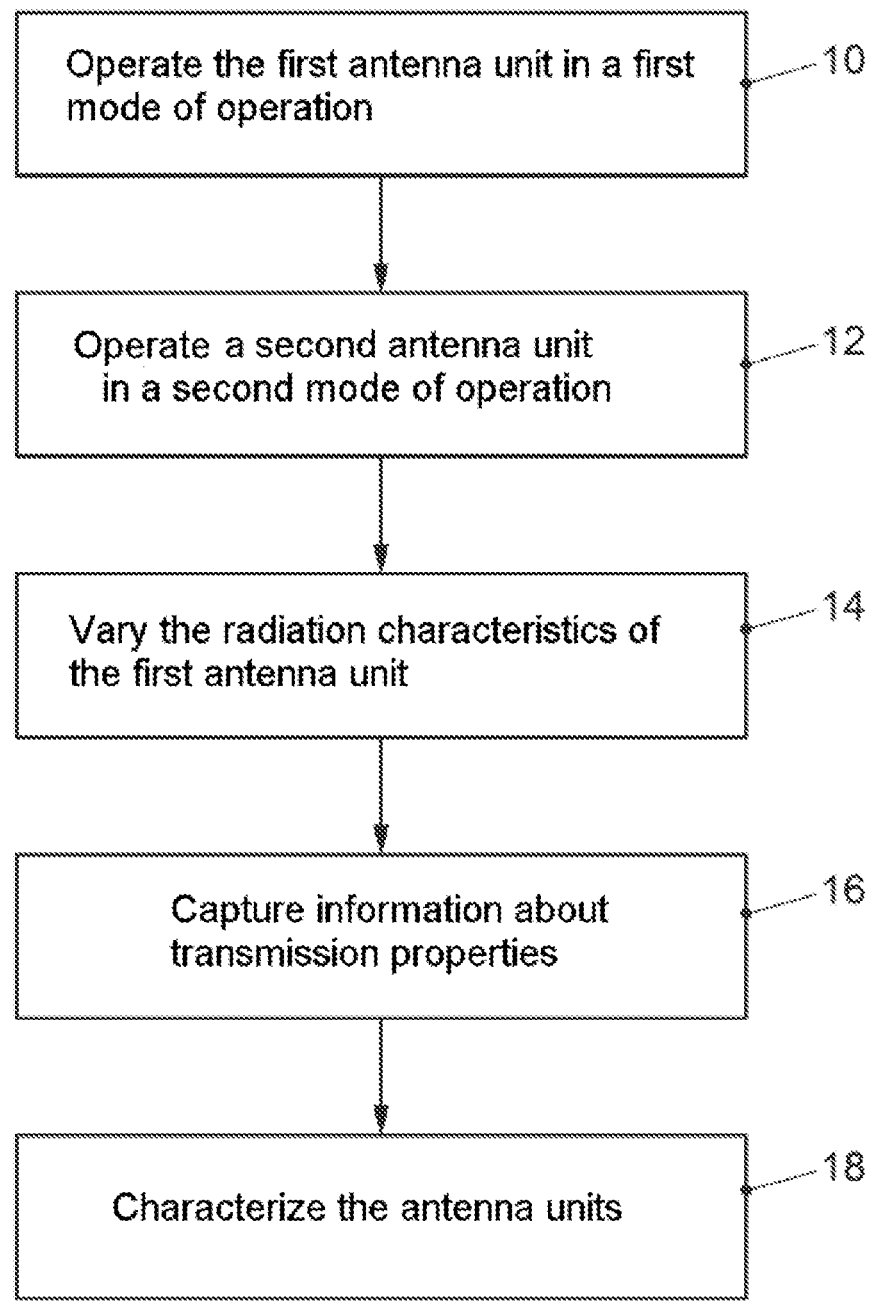
FIG. 1 shows a flowchart for an exemplary embodiment of a method for characterizing a plurality of antenna units.

Mobile devices are being used to an ever greater extent in enclosed spaces too (also referred to as indoors). In vehicles, for example, such as automobiles, trains, airplanes, buses, ships, etc., mobile devices are used for communication, for entertaining the passengers, for forwarding relevant information about the vehicle condition or about the traffic situation on the planned route, etc. In this case, it may be useful to distribute information in a targeted manner in the space, for example, depending on the position of the mobile device in the space, e.g., in the passenger compartment. By way of example, an incoming telephone call or an update to the route information can be signaled to the mobile device of the driver. A game for entertainment can cover all mobile devices of the passengers apart from the mobile device of the driver. For such an association, it is expedient to know the whereabouts of the mobile terminal in the space, e.g., in the vehicle. It is then possible to match transmission concepts to the whereabouts and accordingly to adapt a quality of service or a transmission capacity. By way of example, it is possible for spatial transmission concepts to be improved based on a piece of information about a whereabouts of a terminal.

It is to be expected that the use of locating techniques for position estimation for mobile terminals will become more and more important in the next few years to improve user satisfaction (also referred to as the user experience). Particularly in vehicles, this results in many impressive opportunities for use. The use of radio engineering for locating purposes can give rise to additional costs, which are caused by complex calibration. One possible method for calibrating an implementation of antenna units in a vehicle performs calibration by using one or more test transmitters that are placed at multiple predefined positions in the vehicle interior, and in this way calibration parameters can be measured. Detection of an occupancy in the vehicle interior is further performed by means of additional sensors, for example, by means of pressure sensors or switches integrated in seats.

Mobile devices may in this case be mobile radios according to one or more standardized mobile radio standards. These may be suitable for near field communication and/or for spanning longer distances. Passenger compartments are known in a wide variety of orders of magnitude and comprise compartments for motor cars, motor homes, trucks and even the passenger compartment of buses, trains, airplanes, ships, etc.

A further possibility for locating is implemented using an ultrasonic pen. In this case, the pen emits an infrared light pulse that propagates at the speed of light. This light impulse is detected by an infrared diode. At the same time, the pen emits an ultrasonic signal that is picked up by two ultrasonic microphones. Since sound propagates only at approximately 330 meters/second, the time difference in relation to the optical signal can be used to detect the distance and, as a result of a distributed position of microphones, the direction of the signal in one plane. However, this concept for locating mobile devices is sometimes less suitable, since the pen is not constantly in proximity to the mobile device. Alternatively, the mobile device could send infrared light pulses and ultrasonic signals, which would have a negative influence on its supply of energy and, moreover, is normally not provided for in commercially available mobile devices.

Locating methods that are based on the propagation properties of electromagnetic waves are further known. Different RF technologies in frequency ranges from a few kilohertz through to ultrawideband (UWB) technology at frequencies between 3.2 and 10.6 gigahertz are used in this case. In this case, the item to be located is provided with an applicable marking, for example, a radio frequency identification transponder (RFID tag), to be locatable. However, this requires the mobile devices to have a supplementary element mounted on them, for example, the aforementioned RFID tag. This can be handled only in a complex way, particularly when there are changing mobile devices in the passenger compartment.

Possible locating technologies outside the passenger compartment and the vehicle are based on GPS (global positioning system) or on triangulation of signals from base stations, which are used for cellular mobile radio, for example. However, this position finding is too inaccurate to determine the position of a terminal in a space that, for example, comprises just a passenger compartment. Electromagnetic waves are moreover transmitted into enclosed spaces only with attenuation and/or distortion, and this can have a negative influence on locating within the space.

There is therefore a need to provide an improved concept for characterization in an enclosed space.

This is taken into account by an apparatus, a method and a computer program each having the features of the independent patent claims. Configurations and developments are the subject matter of the dependent claims.

Exemplary embodiments are based on the central idea of using multiple antenna units in a space for the purpose of characterization among one another and thus subsequently being able to perform locating of mobile devices within the space. In this case, the antenna units can be changed over between sending and receiving mode and, in this case, different radiation characteristics of the antenna units can be continually iterated. Information about the associated transmission properties can then be evaluated for the purpose of characterization.

Exemplary embodiments provide methods for characterizing a plurality of antenna units in a predefined space. The antenna units are designed to provide coverage with radio services for a mobile transceiver in the space. An antenna unit can in this case be operated in two modes of operation, sending and receiving. At least one first antenna unit has multiple radiation characteristics. The method comprises operating the first antenna unit in a first mode of operation and operating a second antenna unit in a second mode of operation. The method further comprises varying the radiation characteristics of the first antenna unit and capturing information about transmission properties between the first antenna unit and the second antenna unit for the radiation characteristics. The method further comprises characterizing the antenna units based on the information about the transmission properties.

Exemplary embodiments further provide an apparatus for characterizing a plurality of antenna units in a predefined space, wherein the antenna units are designed to provide coverage with radio services for a mobile transceiver in the space. An antenna unit can be operated in two modes of operation, sending and receiving, and at least one first antenna unit has multiple radiation characteristics. The apparatus comprises one or more interfaces for the plurality of antenna units. The apparatus further comprises a control module for controlling the one or more interfaces. The control module is designed to operate the first antenna unit in a first mode of operation and to operate the second antenna unit in a second mode of operation. The control module is further designed to vary the radiation characteristics of the first antenna unit and to capture information about transmission properties between the first antenna unit and the second antenna unit for the radiation characteristics. The control module is furthermore designed to characterize the antenna units based on the information about the transmission properties.

Exemplary embodiments provide a strategy for simplifying a process for calibration or characterization and provide a fundamental concept for further application options (e.g., detection of vehicle occupancy and vehicle interior state) or for improvements to the position finding for mobile terminals. Exemplary embodiments can allow characterization of multiple antenna units, the antenna units themselves being used for characterization and it being possible to dispense with use of additional test transmitters.

In some exemplary embodiments, the first mode of operation may be sending and the second mode of operation may be receiving. The first antenna unit can then use the various radiation characteristics to send, and corresponding received signals be captured on the second antenna unit. In further exemplary embodiments, the second mode of operation may be sending and the first mode of operation may be receiving. The first antenna unit can then use the various radiation characteristics to receive and can capture corresponding received signals that go back to a transmission signal of the second antenna unit. Exemplary embodiments can thereby capture the various benefits or drawbacks of the radiation characteristics, evaluate them and subsequently use them by virtue of the characterization.

In further exemplary embodiments, the second antenna unit can likewise have multiple radiation characteristics. The second antenna unit can then be operated in the first mode of operation and the first antenna unit can be operated in the second mode of operation, analogously to the receiving or sending embodiment described above. The radiation characteristics of the second antenna unit can then likewise be varied and information about transmission properties between the first antenna unit and the second antenna unit for the radiation characteristics can be captured. Exemplary embodiments can thus allow capture and characterization of combination options between radiation characteristics of multiple antenna units. Some exemplary embodiments allow the capture and characterization of all combination options for radiation characteristics of multiple antenna units.

In some exemplary embodiments, an antenna unit comprises multiple antenna elements and the radiation characteristics comprise different beamforming modes with different main radiation directions. It is thus possible to capture transmission properties for combination of the respective main radiation directions for sending and receiving mode in each case and thus to perform appropriate characterization.

In exemplary embodiments, the varying of the radiation characteristics can be effected with a time offset, e.g., sequentially in an iteration. Additionally or alternatively, the varying of the radiation characteristics can be effected with an offset in the frequency domain, e.g., various frequencies, carriers, subcarriers, etc., can be used. Additionally or alternatively, the varying of the radiation characteristics can be effected by different code identifiers, e.g., using orthogonal codes, which allow division of the signals with different radiation characteristics. Exemplary embodiments can thus allow the characterization signals to be matched to the transmission system used, e.g., a multiple access method.

In further exemplary embodiments, the varying of the radiation characteristics can comprise using every possible radiation characteristic of the first antenna unit. The capturing of the information about the transmission properties between the first antenna unit and the second antenna unit can accordingly comprise information about transmission properties for every radiation characteristic of the first antenna unit. Exemplary embodiments can thus capture transmission properties for all combinations of radiation characteristics at the transmission end and at the reception end and allow accordingly optimized or improved system configuration. In further exemplary embodiments, the varying of the radiation characteristics can comprise using every possible radiation characteristic of the second antenna unit and the capturing of the information about the transmission properties between the first antenna unit and the second antenna unit for every radiation characteristic of the second antenna unit.

The characterizing of the antenna units can comprise, based on the information about the transmission properties, storing a piece of information about a radio channel property for the various radiation characteristics. Exemplary embodiments can thus put off a need for fresh characterizing, or allow a comparison between the results of multiple characterizations. By way of example, in further exemplary embodiments, the method can be repeated. Additionally, it is then possible to perform a comparison of stored information about the radio channel property for the various radiation characteristics with information captured during the repetition of the method about the transmission properties for the radiation characteristics. Further, ascertaining of a piece of location information about an object situated in the space can be effected via the comparison. Exemplary embodiments can thus ascertain a detection of objects in the space and the location thereof in the space. In some exemplary embodiments, the predefined space can correspond to an interior of a vehicle.

In some exemplary embodiments, in which the predefined space is an interior of a vehicle having multiple seats, the object situated in the space may be a person in one of the seats. The location information can then correspond to a piece of information about the occupancy of the seats in the vehicle. The information about the occupancy of the seats can then be used to locate a mobile terminal in the vehicle. This information can then be used to adapt transmission parameters, such as the radiation characteristics of the antenna units, for example. In some exemplary embodiments, the information about the occupancy of the seats can be used to select a radiation characteristic of an antenna unit for data transmission with a mobile terminal in the vehicle.

In general, exemplary embodiments may also be implemented as a program, firmware, computer program or computer program product having a program code or as data, wherein the program code or the data is or are active to the effect of performing one of the methods when the program runs on a processor, computer or a programmable hardware component. The program code or the data may also be stored on a machine-readable medium or data medium, for example. The program code or the data may be available, inter alia, as source code, machine code or byte code and as other intermediate code.

Exemplary embodiments furthermore provide one of the methods described above or a computer program for use in a vehicle. A further exemplary embodiment is a vehicle having the apparatus described above.

Various exemplary embodiments are now described in more detail with reference to the accompanying drawings, in which some exemplary embodiments are depicted. Optional features or components are depicted using dashed lines in this case.

Although exemplary embodiments may be modified and amended in various ways, exemplary embodiments are depicted as examples in the figures and are described thoroughly herein. It should be clarified, however, that there is no intention to restrict exemplary embodiments to the forms respectively disclosed, rather that exemplary embodiments are intended to cover all functional and/or structural modifications, equivalents and alternatives that lie within the scope of the disclosure.

It should be noted that one element denoted as "connected" or "coupled" to another element may be directly connected or coupled to the other element, or that intervening elements may be present. By contrast, if one element is denoted as "directly connected" or "directly coupled" to another element, then no intervening elements are present. Other terms used to describe the relationship between elements should be interpreted in a similar way (e.g., "between" vis-à-vis "directly therebetween", "adjacent" vis-à-vis "directly adjacent", etc.).

The terminology used herein serves merely to describe specific exemplary embodiments and is not intended to restrict the exemplary embodiments. As used herein, the singular forms "a", "an" and "the" are also intended to include the plural forms, as long as the context does not explicitly indicate something else. Furthermore, it should be clarified that the expressions such as, e.g., "includes", "including", "has", "comprises", "comprising" and/or "having", as used herein, indicate the presence of stated features, integers, operations, work sequences, elements and/or components, but do not exclude the presence or the addition of one or one or more features, integers, operations, work sequences, elements, components and/or groups thereof.

FIG. 1 shows a flowchart for an exemplary embodiment of a method for characterizing a plurality of antenna units in a predefined space. The antenna units are designed to provide coverage with radio services for a mobile transceiver in the space. The antenna units can be operated in two modes of operation, sending and receiving. At least one first antenna unit has multiple radiation characteristics. The method comprises operating 10 the first antenna unit in a first mode of operation and operating 12 a second antenna unit in a second mode of operation. The method further comprises varying 14 the radiation characteristics of the first antenna unit and capturing 16 information about transmission properties between the first antenna unit and the second antenna unit for the radiation characteristics. The method further comprises characterizing 18 the antenna units based on the information about the transmission properties.

Figure 2:
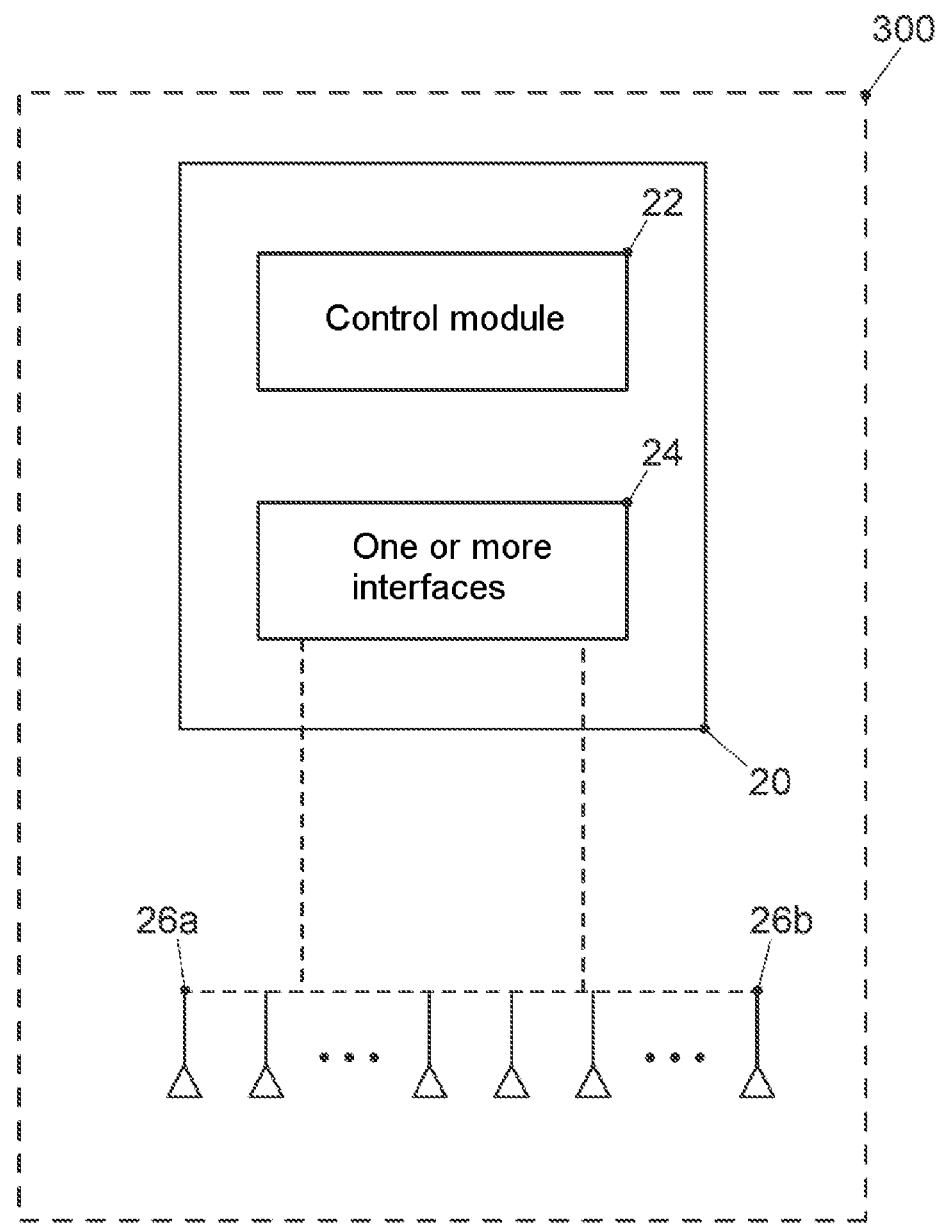
FIG. 2 shows an illustration of an exemplary embodiment of an apparatus for characterizing a plurality of antenna units.

FIG. 2 shows an illustration of an exemplary embodiment of an apparatus 20 for characterizing a plurality of antenna units 26a, 26b in a predefined space. The antenna units 26a, 26b are designed to provide coverage with radio services for a mobile transceiver in the space. The antenna units 26a, 26b can be operated in two modes of operation, sending and receiving. At least one first antenna unit 26a has multiple radiation characteristics. The apparatus 20 comprises one or more interfaces 24 for the plurality of antenna units 26a, 26b. The apparatus 20 further comprises a control module 22 for controlling the one or more interfaces 24, wherein the control module 22 is coupled to the one or more interfaces 24. The control module 22 is designed to operate the first antenna unit 26a in a first mode of operation and to operate the second antenna unit 26b in a second mode of operation. The control module 22 is further designed to vary the radiation characteristics of the first antenna unit 26a and to capture information about transmission properties between the first antenna unit 26a and the second antenna unit 26b for the radiation characteristics. The control module 22 is designed to characterize the antenna units 26a, 26b based on the information about the transmission properties. A further exemplary embodiment is the vehicle 300 shown in dashed lines, e.g., an automobile, a bus, a train, an airplane, a ship, etc.

In exemplary embodiments, the control module 22 can correspond to any controller or processor or to a programmable hardware component. By way of example, the control module 22 may also be realized as software that is programmed for a corresponding hardware component. In this respect, the control module 22 may be implemented as programmable hardware with appropriately adapted software. It is possible for any processors, such as digital signal processors (DSPs), to be used in this case. Exemplary embodiments are not limited to one particular type of processor in this case. Any processors or even multiple processors are conceivable for implementing the control module 22. Implementations in integrated form with other control units are also conceivable, for example, in a control unit for a vehicle, which additionally comprises one or more other functions. The method operations described herein can be carried out, in exemplary embodiments, by the control module 22.

The one or more interfaces 24 can correspond, by way of example, to one or more inputs for receiving information or signals, for example, in digital bit values, voltages, currents or electromagnetic waves, for example, based on a code, within a module, between modules, or between modules of different entities. In this respect, the one or more interfaces are suitable for communicating, i.e., for sending and/or for receiving, signals using antenna units. In this case, there may be still further components present or connected between the one or more interfaces, examples being power amplifiers, filters, diplexers, duplexers, mixers, phase shifters, low noise amplifiers (LNAs), etc.

An antenna unit 26a, 26b can comprise one or more antenna elements that are designed for sending and/or for receiving. It is also conceivable for an antenna unit to comprise different antenna elements for sending and for receiving. Antenna elements of different types can be used in this case, examples being dipoles, horn antennas, patch antennas, magnetic antennas, etc. The individual antenna elements may be arranged in predefined geometries in this case, for example, e.g., linearly, circularly, rectangularly, triangularly, etc. Constructive or destructive superposition of the signals by means of the antenna elements, which is also called beamforming, allows preferential directions or main radiation directions (constructive superposition) and attenuation directions (destructive superposition) to be produced relative to an antenna unit in exemplary embodiments. This takes place as a result of appropriate phases and/or amplitude variations in the signals on the individual antenna elements. These can then be used for ascertaining incident directions of signals too, for example. Incident directions and also radiation directions can then be used for locating or ascertaining the position of transmitters or receivers, for example.

If the positions are ascertained by using a radio signal sent by the mobile device, for example, then the position of the mobile device can be characterized by the field strength measurements at the antenna for variation of the phase differences. In this case, the antenna may be embodied as a group antenna, in which antennas are constructed from a number of single antenna elements whose radiated fields overlap and, through constructive superposition, form to produce a shared antenna pattern. The reception direction of the signal can be ascertained using a two-antenna array (antenna array with two antenna elements) and adjustable phase shifters, for example. For this purpose, the received signals from the two antennas have their phases shifted relative to one another in n operations (for example, n=8, n=16) and are then added. From the signal strength of the summed signal, it is possible to estimate the reception direction. This corresponds to the direction that is associated with the strongest summed signal (best antenna lobe).

When one antenna is actually used, it is possible to ascertain the whereabouts of the sought device for specific spatial conditions, if need be by using the spatial geometry of the mobile or predefined space. When multiple antennas are used, it is possible to ascertain the position of the sought device from multiple direction estimates. The sectional area of the "best" antenna lobes (also referred to as beams) of the individual antenna arrays yields the position estimate.

In this case, the ascertainment of the position can be performed using different accuracies, depending on technical options and envisaged use. As such, the position finding can yield a region in which the item is situated. This region may be a section on which the mobile device is situated within the movable or predefined space. Further, ascertainment of the position can also be performed with greater or lesser pinpoint accuracy. In this case, the ascertainment of the position always relates to a reference system. An absolute reference system in this case is the earth, for example, for which the ascertained position may be indicated in degrees longitude and latitude, for example. A relative ascertainment of the position can also relate to an item in a space, the space itself being able to be mobile in its environment. As such, the predefined space may be a passenger compartment or an interior of a vehicle, for example. In general, ascertainment of the position (or of a relative position in the space) can also be understood as locating.

In the case of a passenger compartment having two seats, the mobile devices of the driver and the passenger can be distinguished sufficiently accurately using an antenna, which may have the appearance of an antenna array. Applications in other movable or predefined spaces are also possible, these being able to be configured as part of a test arrangement for physiological tests for multiple tested people, for example.

It is therefore possible to ascertain the mobile device associated with the driver, for example, which may be embodied as an item of clothing (wearable, e.g., smartwatch) for the purpose of capturing his physiological parameters. These can then be taken into consideration in a system for actively influencing driving behavior, for example. By contrast, the physiological parameters of passengers are irrelevant for this system.

Optionally, the method can comprise receiving the radio signal of the mobile device using a second antenna. Further, it can comprise ascertaining a second reception direction of the radio signal of the mobile device relative to the orientation of the second antenna. Further, it can comprise ascertaining the position of the mobile device taking into consideration the first and second reception directions of the radio signal.

In this case, the ascertainment of the position can be based on two reception directions. Depending on the arrangement of the antennas in the movable or predefined space, it is therefore possible to sense the position of the mobile device more accurately. It is thus possible for an antenna lobe (beam), of a funnel, of one antenna, using the antenna lobe of the second antenna, to yield a sectional area of the two antenna lobes in or at which the mobile device is located. It is beneficial in this regard for the antennas to be placed or arranged such that the reception angles of the two antennas differ significantly. As such, position ascertainment is more accurate with a difference of approximately 90 degrees than with 10 degrees, for example.

If, for example, there is a need for position finding for mobile devices within a passenger compartment based on seat position, then it is possible to arrange at least three antennas. Given expedient positioning of the antennas, this results in a sectional volume that is formed by the now three antenna lobes corresponding to the three reception directions. By taking into consideration these three antenna lobes, it is normally possible to associate the mobile device with a seat in the passenger compartment with sufficient accuracy. It is thus possible to distinguish the mobile device of the driver from the mobile devices of the passengers, for example. Even in passenger compartments having seats split into multiple rows of seats, it is thus possible to associate the mobile devices with the seats with sufficient accuracy. There is also benefit in arrangements having four antennas, which further increase the certainty or reliability of position ascertainment. Antennas are designed to sense electromagnetic radiation. They are known in many designs and can comprise planar antennas, group antennas, linear antennas and magnetic antennas, for example. If a plurality of antennas are arranged in a suitable manner, for example, then, in addition to sensing the electromagnetic radiation, it is also possible to ascertain the direction of the radiation.

This is achieved with antenna arrays, for example, or group antennas. Antenna arrays are distinguished by a plurality of single antenna elements that are actuated individually. A typical distance between the antenna elements is half the wavelength (lambda/2) or more in the observed frequency range. Further, antenna arrangements can also comprise a plurality of antenna arrays, so that a position, for example, of a mobile device, can be sensed more accurately from a variety of directions. The antennas are arranged at a fixed location in the movable or predefined space. Antennas can also be supported by sensors to be used collectively for locating mobile devices. Subsequently, the radiation characteristics of the antenna units 26a, 26b are understood to mean different radiation directions (main beam directions), for example, as indicated by the dashed lines in FIG. 2. In some further exemplary embodiments, an antenna unit 26a, 26b comprises multiple antenna elements and the radiation characteristics correspond to different beamforming modes with different main radiation directions.

Mobile devices are usually equipped with communication devices for wireless transmission of data. This particularly also includes radio engineering. Thus, commercially available mobile devices comprise a plurality of standardized radio technologies that are suitable for data transmission. The standardization means that they are compatible with other commercially available mobile devices or associated networks, so that it is fundamentally possible for data communication to take place between the mobile devices. By way of example, it is possible to cite the standards for cellular mobile radio such as GSM (global system for mobile communications), UMTS (universal mobile telecommunications system) and LTE (long term evolution), which are suitable for worldwide connections. For near field communication, WLAN (wireless local area network), NFC (near field communication), Bluetooth and UWB (ultrawideband technology) are known as radio standards that can communicate from a range of a few centimeters to a few 100 meters. However, it is also possible for other radio standards or even proprietary systems to be used for data transmission. The mobile devices may be designed in different sizes and can comprise what are known as mobiles or cellphones and what are known as tablets and also other sizes. They may also be watches, jewelry, items of clothing (what are known as wearables), spectacles, pills that can be swallowed by human beings or animals or other items, so long as they can communicate by radio.

In exemplary embodiments, the antenna units may be adapted to a mobile radio system or mobile communication system, such as Bluetooth, wireless local area network (WLAN), WirelessFidelity (WiFi), mobile radio, etc. In this case, mobile radio systems standardized by appropriate standardization committees, such as, e.g., the 3rd Generation Partnership Project (3GPP) group, can be considered, for example. By way of example, these comprise the Global System for Mobile communications (GSM), enhanced data rates for GSM evolution (EDGE), GSM EDGE radio access network (GERAN), the universal terrestrial radio access network (UTRAN) or the evolved UTRAN (E-UTRAN), such as, e.g., the universal mobile telecommunication system (UMTS), long term evolution (LTE) or LTE-Advanced (LTE-A), fifth-generation system (5G) or even mobile radio systems of other standards, such as, e.g., Worldwide Interoperability for Microwave Access (WIMAX), IEEE802.16 or wireless local area network (WLAN), IEEE802.11, and also generally a system that is based on a time division multiple access (TDMA) method, frequency division multiple access (FDMA) method, code division multiple access (CDMA) method, orthogonal frequency division multiple access (OFDMA) method or another technology or multiple access method. Subsequently, the terms mobile radio system, mobile radio network, mobile communication system and mobile radio network are used synonymously.

It is subsequently assumed that a mobile radio system of this kind comprises at least one stationary transceiver in the sense of a base station that has a link to the circuit-connected portion of the mobile radio network. On the other hand, it is assumed that the mobile radio network comprises at least one mobile transceiver (mobile radio terminal), the term mobile in this case being intended to relate to the fact that this transceiver is used to communicate via the air interface, i.e., wirelessly/cordlessly. A mobile transceiver of this kind can correspond to a portable telephone, a smartphone, a tablet computer, a portable computer, a vehicle or a radio module, for example, that is not necessarily mobile in the sense that it actually moves in relation to its surroundings. The transceiver may also be stationary (e.g., relative to a motor vehicle), but can communicate wirelessly with the mobile radio network. In this respect, the base station already mentioned can correspond to a base station of one of the aforementioned standards, for example, a NodeB, an eNodeB, etc.

The above-described capturing 16 of information about transmission properties between the first antenna unit 26a and the second antenna unit 26b for the radiation characteristics can then correspond to a channel estimation or to a measurement of a transmission coefficient or else a transfer function. By way of example, it is conceivable to classify or characterize a channel coefficient on the basis of an attenuation and/or a phase. In some exemplary embodiments, it is also conceivable to capture further variables, such as, e.g., a temporal expansion (also referred to as delay spread) or a frequency domain characteristic.

Figure 3:
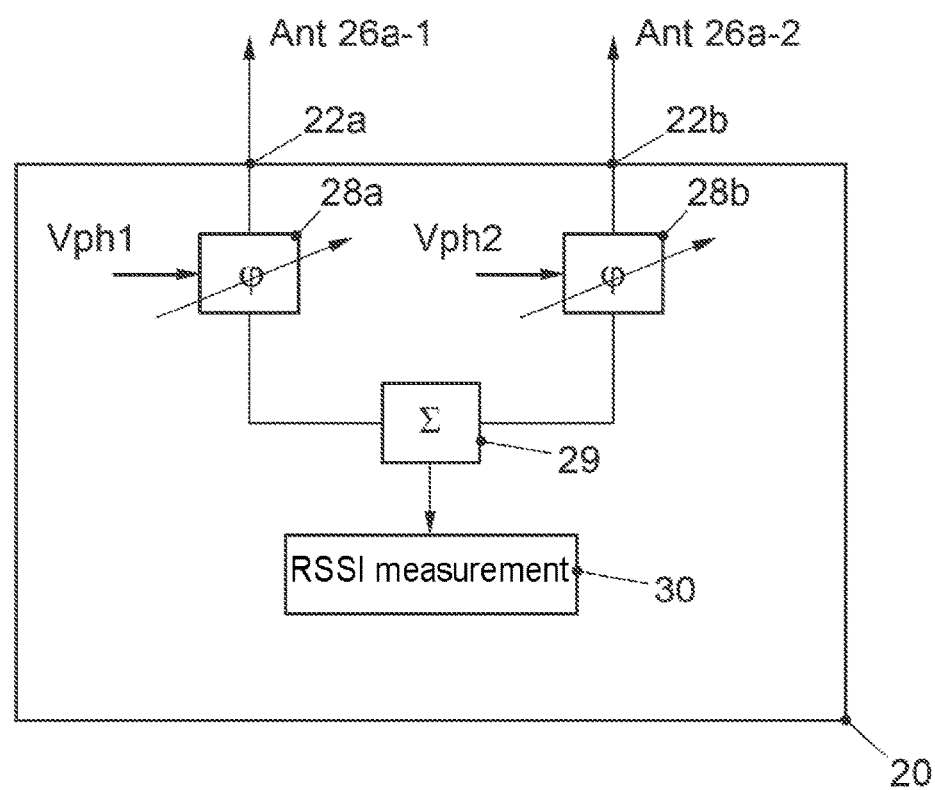
FIG. 3 shows a block diagram of an exemplary embodiment of a further apparatus for characterization.

FIG. 3 shows a block diagram of an exemplary embodiment of a further apparatus 20 for characterization. The apparatus comprises two interfaces 22a, 22b for two antenna elements 26a-1, 26a-2 of an antenna unit 26a. The apparatus 20 further comprises two phase shifters 28a and 28b that can be used to modify the phases of the signals from the antenna elements 26a-1 and 26a-2. FIG. 3 illustrates the case of reception, the case of transmission being analogous in the opposite transmission direction. In a summator 29, the signals are then added, with constructive and/or destructive superposition being able to be obtained depending on the relative phase angle. Based on the summed signal, it is then possible to determine a measure of power for the received signal. In the exemplary embodiment of FIG. 3, this is accomplished by the component 30, which determines a receive signal strength indicator. Depending on the phase shifter settings, it is then possible to ascertain that phase setting for which a high or even the highest RSSI value is obtained. This then corresponds to a spatial radiation characteristic that is dependent not only on the relative phase setting but also on the geometric arrangement of the antenna elements. The exemplary embodiment of FIG. 3 shows the phase shifters integrated in the apparatus 20. In further exemplary embodiments, it is also conceivable for the phase shifters to be arranged outside the apparatus 20. The phase shifters can also have a discrete range of values, i.e., a certain predefined number of phase values can be set therein. Furthermore, the phase shifters can also be combined, so that predefined relative phase settings between the antenna elements can be selected. This can be effected in analog or digital form in exemplary embodiments. By way of example, a Butler matrix (analog phase settings in the radio-frequency range) can be used to select predefined antenna lobes.

Figure 4:
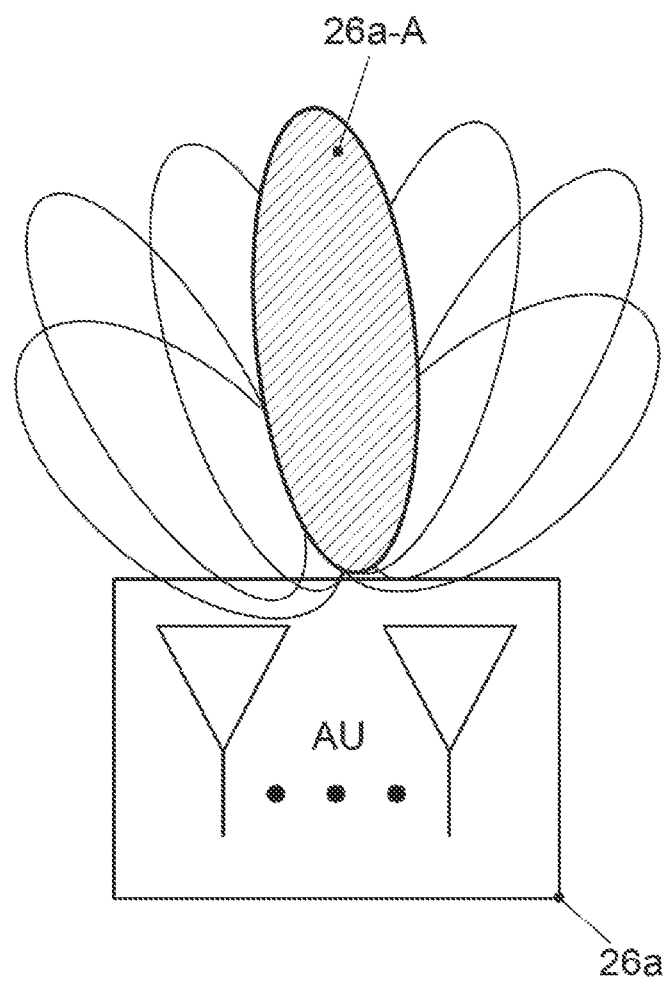
FIG. 4 shows a block diagram of an antenna unit in an exemplary embodiment.

FIG. 4 shows a block diagram of an antenna unit (AU) 26a in at least one exemplary embodiment, the antenna unit comprising at least two antenna elements. The antenna unit 26a allows a selection between multiple main radiation directions, the main radiation direction 26a-A being deemed to have been selected in the exemplary embodiment shown. FIG. 4 illustrates a simplified depiction of the reception/ directional characteristics. These are produced by the combination of the phase-shifted received signals. For this purpose, a phase shifter is implemented between the antenna output and the coupler. For the simplified depiction of the reception/directional characteristic, the received signals are combined by means of a specific phase shifter setting. This direction dependency is used to detect a reception direction that is or can be used to locate transmitters in the vehicle interior (under some circumstances also outside the vehicle).

By selecting (changing over) the different directions, it is thus possible to purposefully address mobile transceivers and to reject perturbations (interference). On reception, it is thus possible to receive signals from the preferential directions, noise powers that come from other directions thus being able to be reduced or rejected.

In at least one exemplary embodiment, it is accordingly possible for different modes of operation to be chosen for the antenna units 26a, 26b. E.g., the first mode of operation may be sending and the second mode of operation may be receiving. The first antenna unit 26a is then used for sending and the second antenna unit 26b is used for receiving. By way of example, the first antenna unit has the radiation characteristics shown in FIG. 4, which are then continually varied and influence the transmission properties toward the second antenna unit. In a further exemplary embodiment, the second mode of operation may be sending and the first mode of operation may be receiving. The first antenna unit 26a is then used for receiving and the second antenna unit 26b is used for sending. By way of example, the first antenna unit has the radiation characteristics shown in FIG. 4 (now reception characteristics), which are then continually varied and influence the transmission properties away from the second antenna unit 26b.

Figure 5:
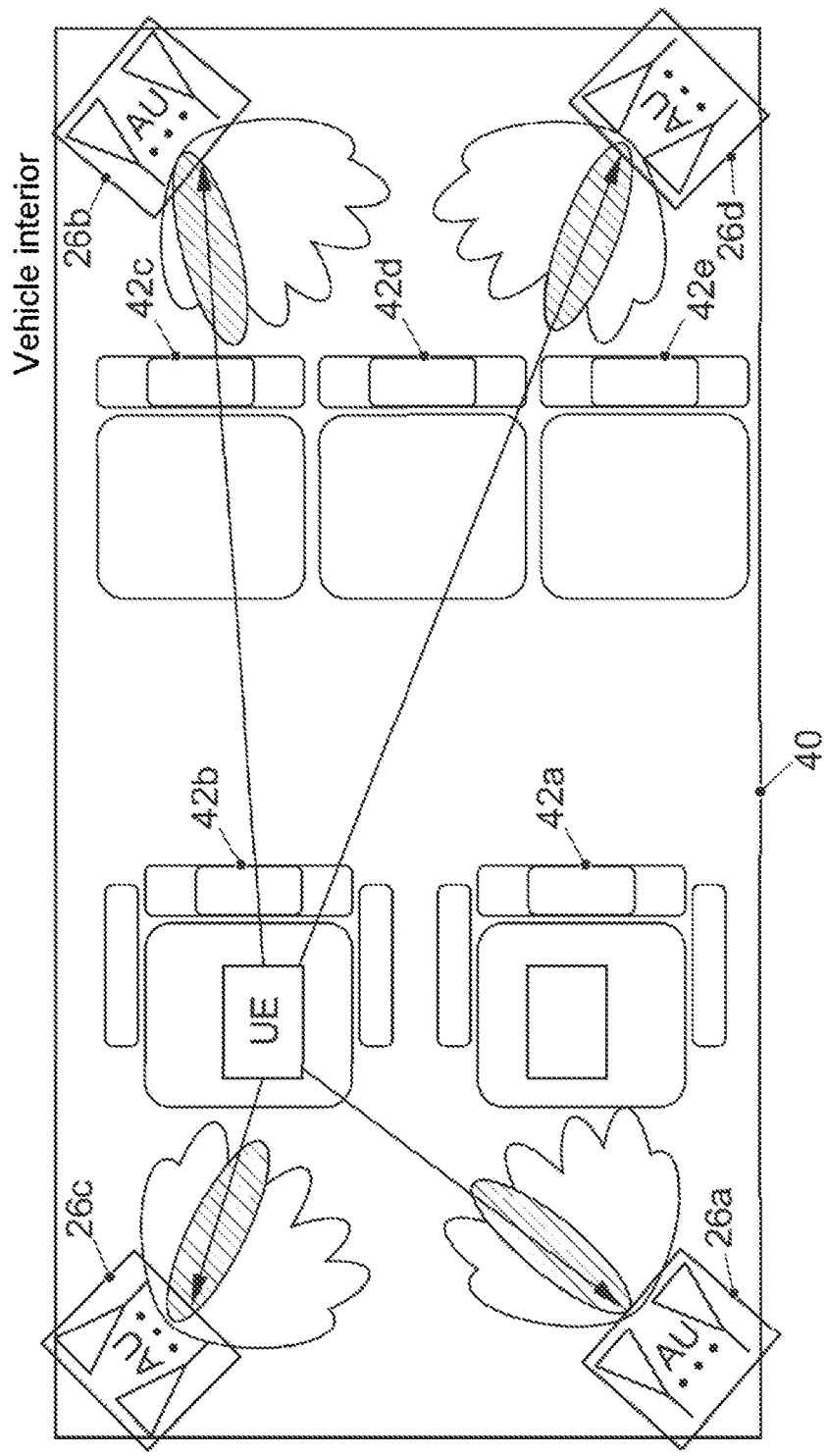
FIG. 5 shows a block diagram of an arrangement of antenna units in an exemplary embodiment.

FIG. 5 shows a block diagram of an arrangement of antenna units 26a, 26b, 26c, 26d in at least one exemplary embodiment. In this exemplary embodiment, the space is a vehicle interior 40 having five seats 42a, 42b, 42c, 42d, 42e, two at the front and three at the rear. Situated in the corners are the total of four antenna units, each one having different radiation characteristics in this case. In this exemplary embodiment, the second antenna unit 26b likewise has multiple radiation characteristics. The method in this case comprises operating the second antenna unit 26b in the first mode of operation and operating the first antenna unit 26a in the second mode of operation. The method further comprises varying the radiation characteristics of the second antenna unit 26b and capturing information about transmission properties between the first antenna unit 26a and the second antenna unit 26b for the radiation characteristics. In this respect, in exemplary embodiments, transmission properties for combinations of the radiation characteristics of multiple antenna units can be captured. An antenna system as shown in FIG. 5 comprises multiple AUs (distributed in the vehicle interior) and is used, by way of example, for locating mobile devices (also referred to as user equipment (UE)) in the interior 40. The fundamental locating can be realized using various approaches/methods (e.g., triangulation, fingerprint, etc.).

Figure 6:
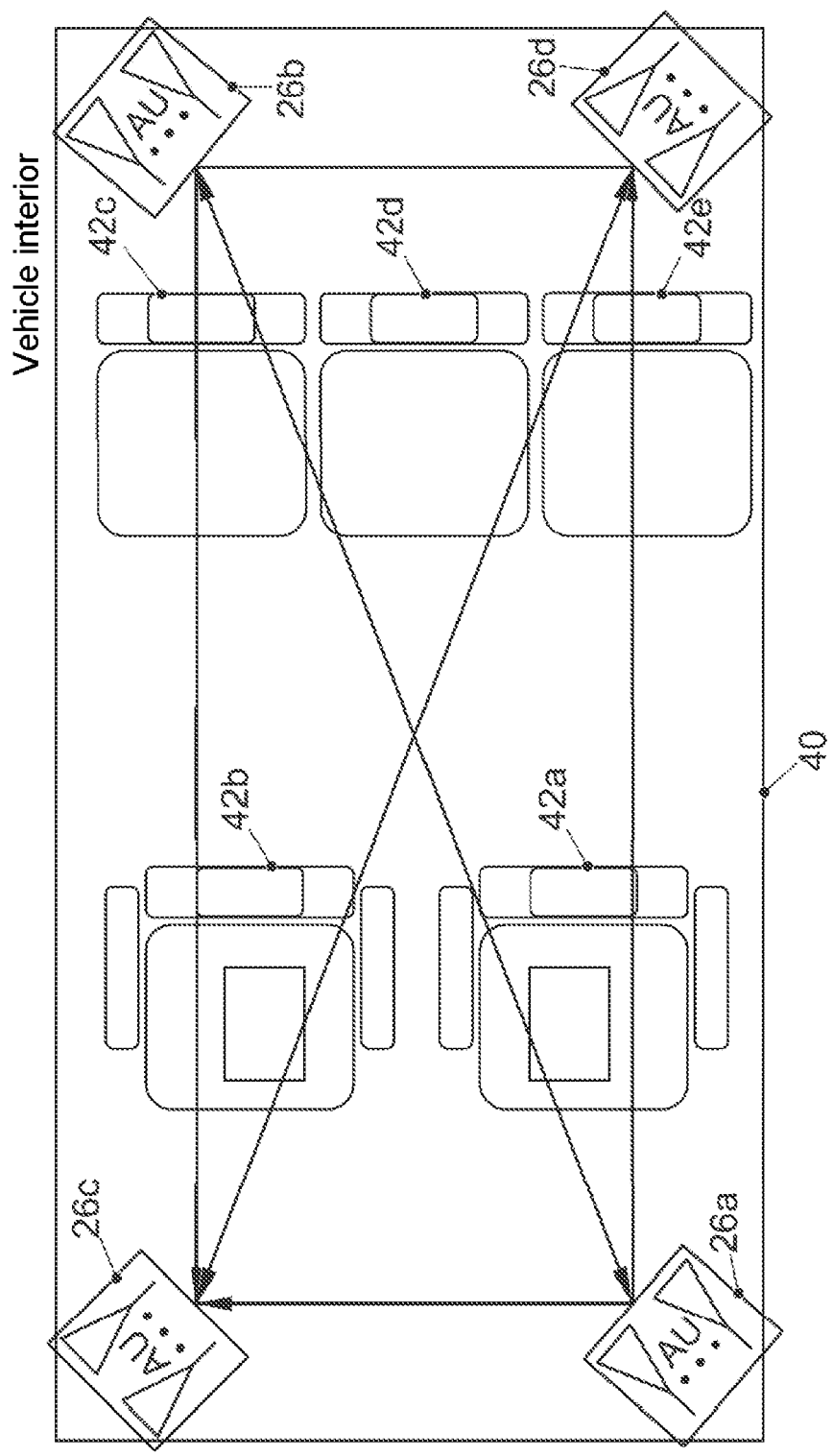
FIG. 6 shows an exemplary embodiment of a method for characterization.

FIG. 6 shows a further exemplary embodiment of a method for characterization. The characterization or calibration is in this case intended to be used to capture the transmission properties of the motor vehicle interior to be able to use them for subsequent locating or data transmission. FIG. 6 illustrates an exemplary embodiment analogous to FIG. 5, with like elements bearing the same reference symbols. In this exemplary embodiment, a self-calibration of the AU system is performed. The use of the reception and transmission capability of the AUs allows measurement of the individual AUs to be performed. The values are used in the evaluation system for calibrating/characterizing the space, or the locating function. As a result, it is possible to "dispense with" more complex characterization of the AU system, for example, using a test transmitter.

Furthermore, exemplary embodiments can classify and detect the occupancy state in the vehicle interior via the radio channel state. The identifying of the occupancy state can be used inter alia for improving the locating method used, as will be explained in even more detail below. In the exemplary embodiment of FIG. 6, all possible combinations between the radiation characteristics of the individual antenna units 26a, 26b, 26c, 26d are accordingly continually varied/tried/iterated, as indicated by the respective arrows. In this exemplary embodiment, the varying of the radiation characteristics comprises using every possible radiation characteristic of the first antenna unit 26a. The capturing of the information about the transmission properties between the first antenna unit 26a and the second antenna unit 26b comprises information about transmission properties for every radiation characteristic of the first antenna unit 26a. Furthermore, the varying of the radiation characteristics comprises using every possible radiation characteristic of the second antenna unit 26b. The capturing of the information about the transmission properties between the first antenna unit 26a and the second antenna unit 26b comprises information about transmission properties for every radiation characteristic of the second antenna unit 26b.

Figure 7:
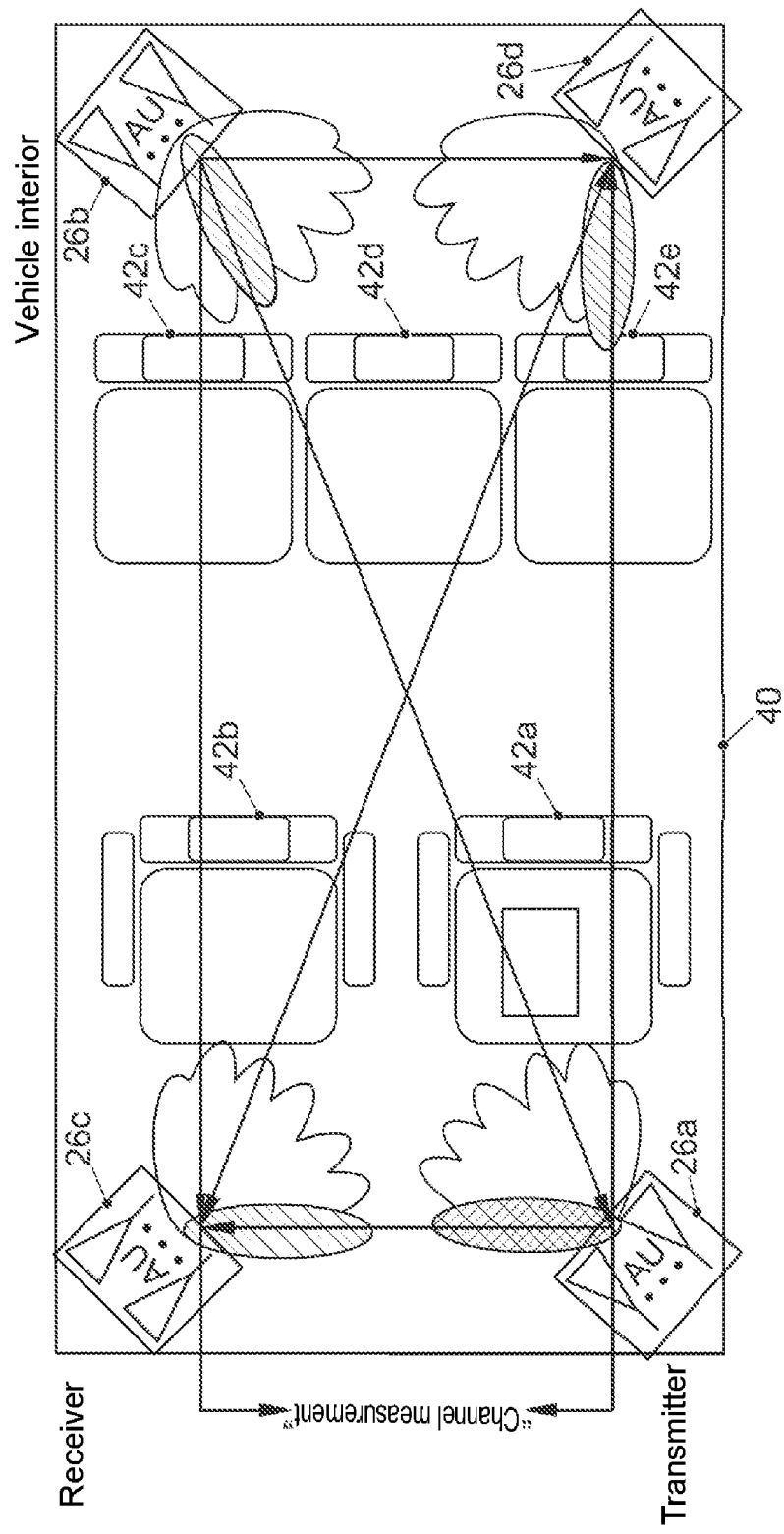
FIG. 7 shows a further exemplary embodiment of a method for characterization.

FIG. 7 illustrates the exemplary embodiment analogous to FIG. 6, with like elements bearing the same reference symbols. In this case, the antenna unit 26a is used as a transmitter and the antenna units 26b, 26c, 26d are used as receivers. While the first antenna unit 26a uses a preselected antenna lobe to radiate a transmission signal, it is possible, at the receiving antenna units 26b, 26c, 26d, to use the respective antenna lobes to determine a reception level (RSSI). These can then be stored in a memory, for example. The characterizing 18 of the antenna units 26a, 26b, 26c, 26d based on the information about the transmission properties comprises storing a piece of information about a radio channel property for the various radiation characteristics, e.g., an RSSI, an attenuation, a phase, etc. For the self-calibration of the AU system in the exemplary embodiment, a respective AU, antenna unit 26a in FIG. 7, is active as transmitter (e.g., 1 of K AUs) and successively sends in the appropriate spatial direction using a phase shifter setting (or a selected radiation characteristic/antenna lobe).

This is indicated in FIG. 7 by the antenna lobe with a dark background (pointing upward). The remaining AUs 26b, 26c, 26d are active as receivers and successively receive in each transmission phase with a predefined phase shifter setting sequence. That is to say that for each of the N phase settings at the transmitter 26a, M measured values (=M phase settings) are obtained in each receiver 26b, 26c, 26d. A total of N*M*(K−1)*K measured values are thus obtained that characterize the space (for N=M=8, K=4, 768 combinations are obtained). In this exemplary embodiment, it is assumed that the radiation characteristics (for transmitter and receivers, respectively) are subjected to time division. In some further exemplary embodiments, however, division in the frequency domain (different radiation characteristics for different frequencies or frequency bands) or in the code domain (use of orthogonal codes) is also conceivable. In this respect, the varying of the radiation characteristics can be effected with a time offset, the varying of the radiation characteristics can be effected with an offset in the frequency domain, and/or, by way of example, the varying of the radiation characteristics can also be effected by different code identifiers.

Figure 8:
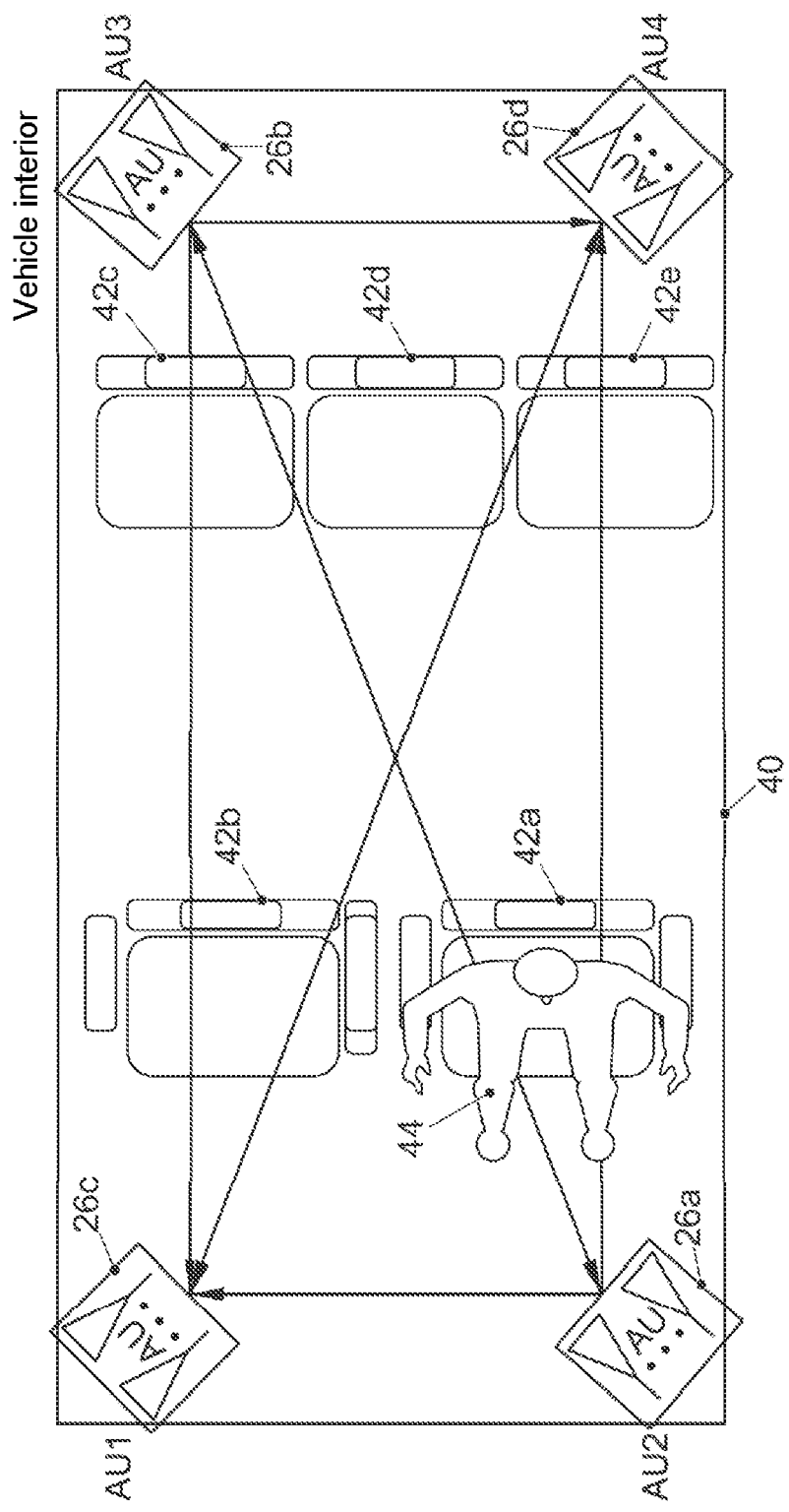
FIG. 8 shows an exemplary embodiment of location of an object.

FIG. 8 illustrates an exemplary embodiment involving locating an object 44, in this case a person who is in a seat 42a. In the exemplary embodiment, the method described above is repeated, so that there are now two captured data records for the transmission properties. Hence, it is possible to compare stored information about the radio channel property for the various radiation characteristics with information captured during repetition of the method about the transmission properties for the radiation characteristics. From this, it is then possible to ascertain a piece of location information about an object situated in the space via the comparison. This is illustrated in FIG. 8. The predefined space is an interior 40 of a vehicle having multiple seats 42a, 42b, 42c, 42d, 42e. The object situated in the space is in this case a person 44 in one of the seats 42a. The location information in this case corresponds to a piece of information about the occupancy of the seats 42a, 42b, 42c, 42d, 42e in the vehicle. The information about the occupancy of the seats 42a, 42b, 42c, 42d, 42e be used for locating a mobile terminal in the vehicle. Any shadowing effects as a result of the person 44 are now known and can be taken into consideration for further locating algorithms. As FIG. 8 further illustrates, the body in the signal path AU2-3 (26a↔26b) and AU2-4 (26a↔26d) means that correspondingly low signal powers (in comparison with empty vehicles) are detected by the evaluation system. Hence, the evaluation system can establish the occupancy state in the vehicle. In this exemplary embodiment, the method further comprises using the information about the occupancy of the seats to select a radiation characteristic of an antenna unit for data transmission with a mobile terminal in the vehicle.

Figure 9:
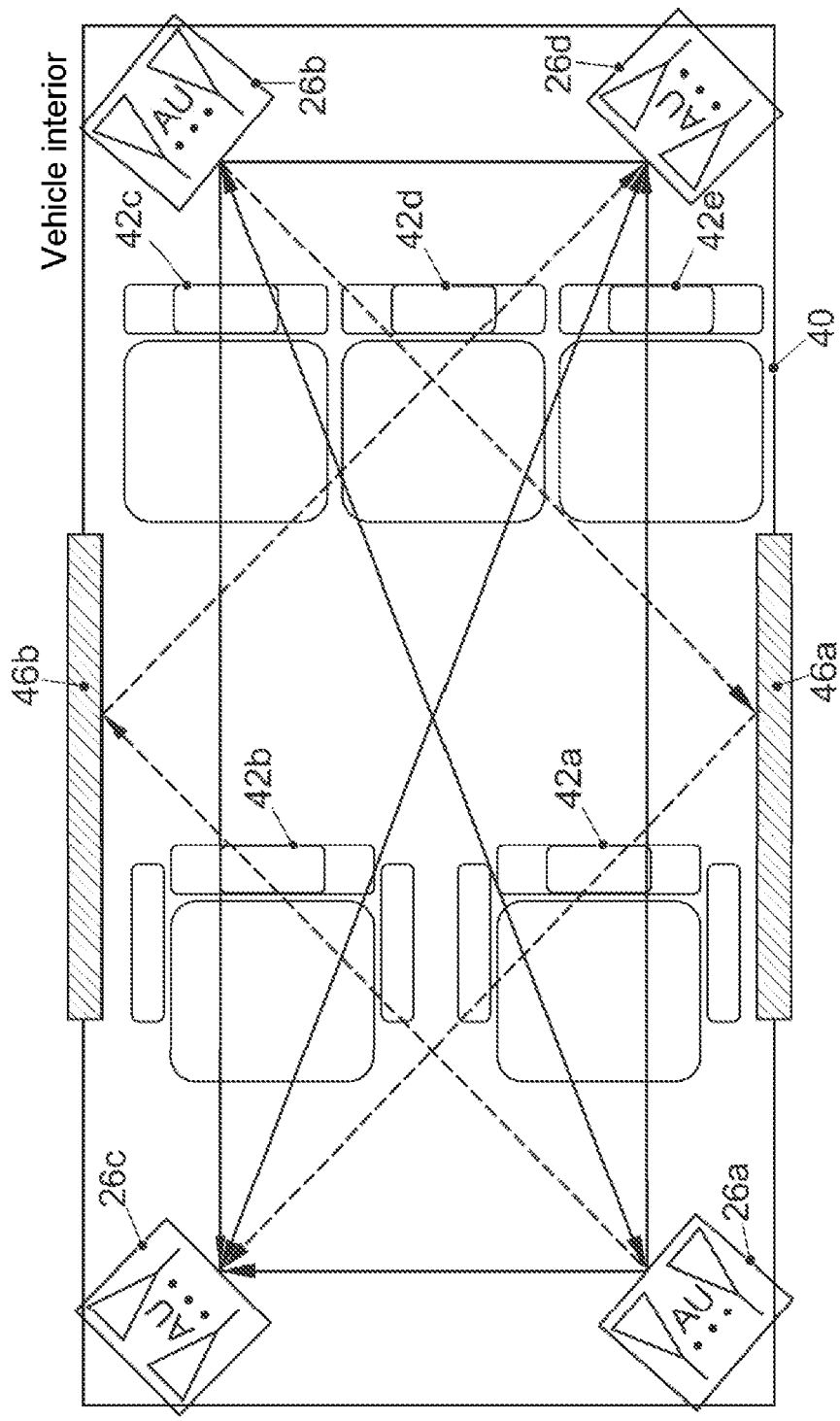
FIG. 9 shows an exemplary embodiment with a reflector.

FIG. 9 shows a further exemplary embodiment in the vehicle interior in line with the preceding figures. In this exemplary embodiment, there are two reflectors 46a, 46b situated at the sides of the interior, which reflectors can be assumed to be ideal or to be real in exemplary embodiments. These reflectors result from the metal pillars (A pillar, B pillar) of an automobile, for example. Reflections occur in the vehicle interior 40. These can be used for finer detection of the occupancy state without additional AUs being installed. FIG. 9 uses dashed lines to show propagation paths within the interior 40, these being able to be taken into consideration for the capture of the transmission properties.

Figure 10:
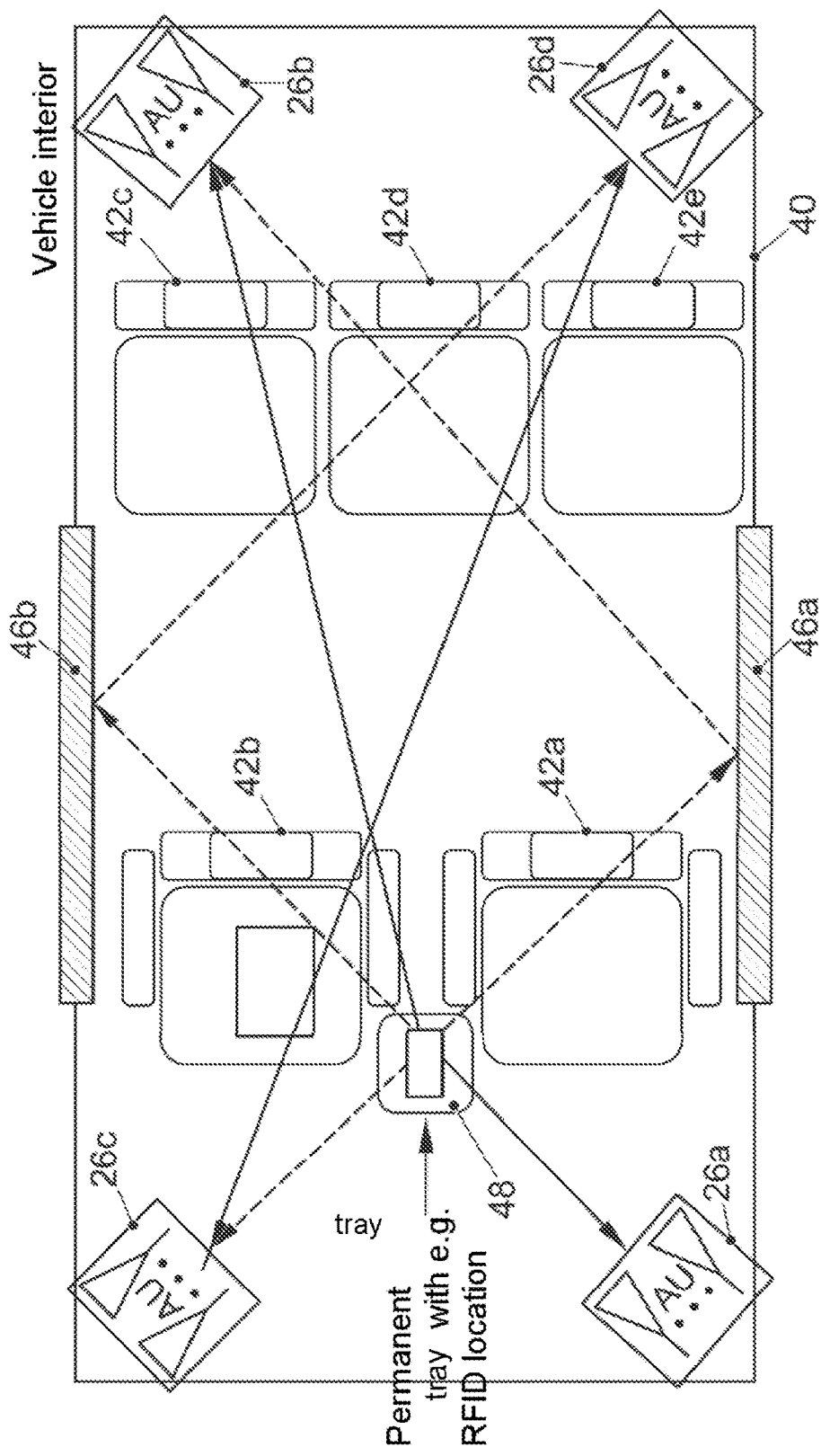
FIG. 10 shows an exemplary embodiment with an RFID tag.

FIG. 10 shows an exemplary embodiment in which additionally an RFID (Radio Frequency IDentification) tag 48 is used for locating a mobile device. A further way of adjusting or improving the AU system is, in some exemplary embodiments, to perform calibration using a (possibly reference) mobile device/UE at transmission positions known to the AU system. In the exemplary embodiment depicted, e.g., at a permanent tray with appropriate RFID location, i.e., in some exemplary embodiments, these positions may be denoted by means of an RFID tag.

Figure 11:
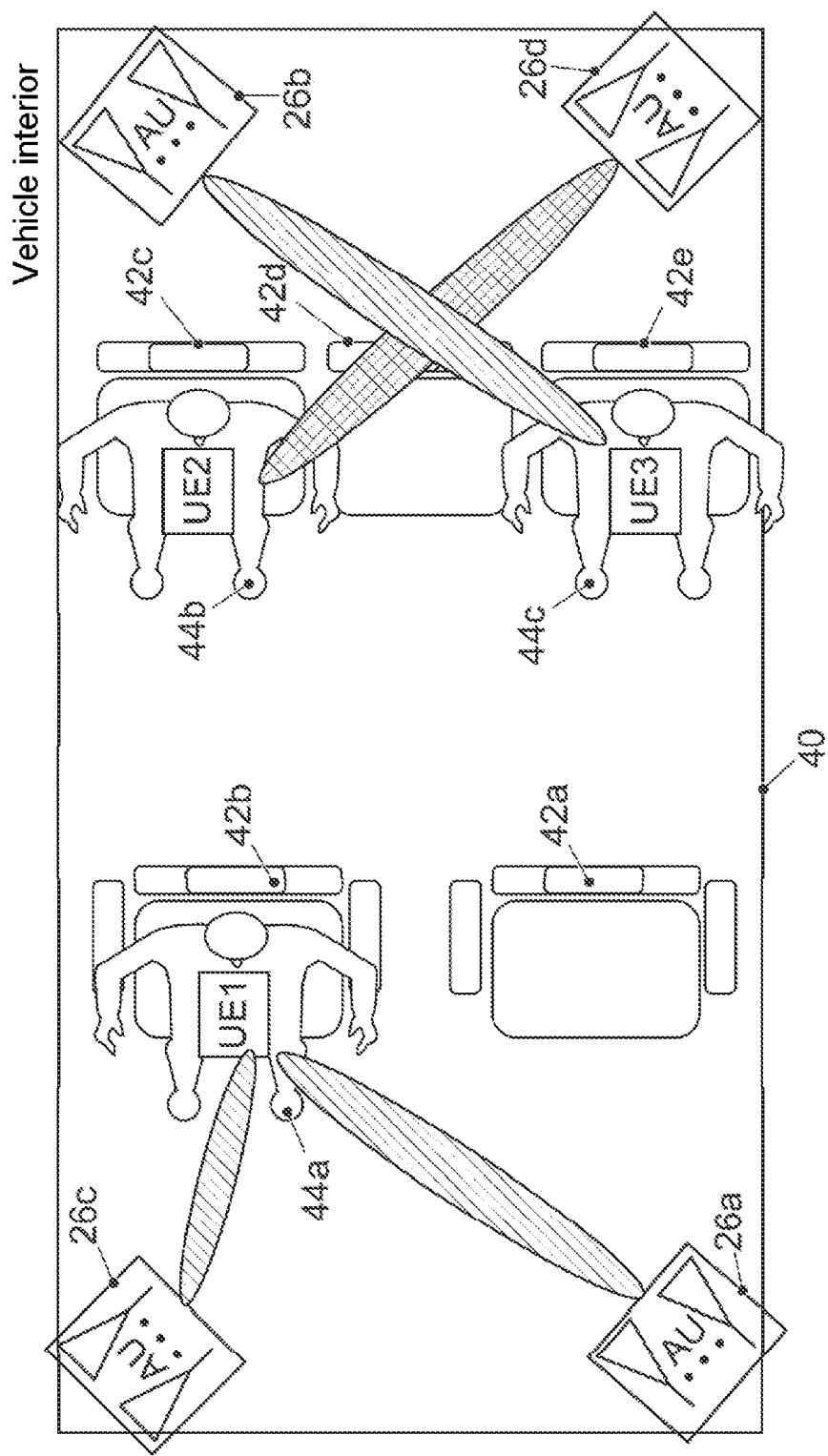
FIG. 11 shows an exemplary embodiment with improved transmission quality in a vehicle interior.

FIG. 11 finally shows a further exemplary embodiment in which a plurality of mobile devices are covered with improved transmission quality in a vehicle interior. FIG. 11 shows the interior 40 already described, wherein three seats 42b, 42c and 42e are now occupied by three persons 44a, 44b and 44c with mobile devices. As a result of the detected occupancy in accordance with the method above, it is now also possible to select the antenna lobes shown in FIG. 11, which result in an optimized transmission in the present exemplary embodiment, since reciprocal perturbations are reduced. An improvement in the reception quality can be achieved by the focusing of the transmission power, and also reduction of interference (or emissions). The opportunity for parallel communication by multiple UEs allows what is known as the user experience to be improved (in terms of data rate and reliability) under some circumstances.

A further exemplary embodiment is a motor vehicle or a vehicle 300 in general with such an apparatus 20 or that is designed to carry out a method as described herein.

Depending on specific implementation requirements, exemplary embodiments may be implemented in hardware or in software. The implementation may be performed using a digital storage medium, for example, a floppy disk, a DVD, a Blu-Ray disc, a CD, a ROM, a PROM, an EPROM, an EEPROM or a FLASH memory, a hard disk or some other magnetic or optical store on which electronically readable control signals are stored which can interact or do interact with a programmable hardware component in such a way that the respective method is performed.

A programmable hardware component may be formed by a processor, a computer processor (CPU=central processing unit), a graphics processor (GPU=graphics processing unit), a computer, a computer system, an application-specific integrated circuit (ASIC), an integrated circuit (IC), a single-chip system (SOC=system on chip), a programmable logic element or a field programmable gate array (FPGA) with a microprocessor.

The digital storage medium may therefore be machine- or computer-readable. Some exemplary embodiments thus comprise a data carrier having electronically readable control signals that are able to interact with a programmable computer system or a programmable hardware component in such a way that one of the methods described herein is performed. At least one exemplary embodiment is a data carrier (or a digital storage medium or a computer-readable medium) on which the program for performing one of the methods described herein is recorded.

Generally, exemplary embodiments may be implemented as program, firmware, computer program or computer program product comprising a program code or as data, wherein the program code or the data is or are effective to the extent of performing one of the methods when the program runs on a processor or a programmable hardware component. The program code or the data may, for example, also be stored on a machine-readable carrier or data carrier. The program code or the data may be present, inter alia, as source code, machine code or byte code and as some other intermediate code.

The exemplary embodiments described above merely constitute an illustration of the principles of the disclosure. It goes without saying that modifications and variations of the arrangements and details described herein will become apparent to others skilled in the art. Therefore, the intention is that the disclosure shall be restricted only by the scope of protection of the following patent claims and not by the specific details that have been presented on the basis of the description and the explanation of the exemplary embodiments herein.

LIST OF REFERENCE SYMBOLS

10 Operating the first antenna unit in a first mode of operation
12 Operating a second antenna unit in a second mode of operation
14 Varying the radiation characteristics of the first antenna unit
16 Capturing information about transmission properties between the first antenna unit and the second antenna unit for the radiation characteristics
18 Characterizing (18) the antenna units based on the information about the transmission properties
20 Apparatus
22 Control module
22a Interface
22b Interface
24 One or more interfaces
26a Antenna unit
26a-1 Antenna element
26a-2 Antenna element
26a-A Selected antenna lobe
26b Antenna unit
26c Antenna unit
26d Antenna unit
28a Phase shifter
28b Phase shifter
29 Summmator
30 RSSI measurement
40 Interior
42a Seat
42b Seat
42c Seat
42d Seat
42e Seat
46a Reflector
46b Reflector
48 Tray with RFID
300 Vehicle

The invention claimed is:

1. A method for characterizing a plurality of antenna units in a predefined space, wherein the antenna units provide coverage with radio services for a mobile transceiver in the predefined space, wherein each antenna unit of the plurality of antenna units is operated in a sending mode and/or a receiving mode of operation, and wherein at least one first antenna unit of the plurality of antenna units has multiple radiation characteristics, the method comprising:
operating the at least one first antenna unit in a first mode of operation;
operating a second antenna unit in a second mode of operation;
varying radiation characteristics of the at least one first antenna unit;
capturing information about transmission properties between the at least one first antenna unit and the second antenna unit about the radiation characteristics;
characterizing the at least one first and second antenna units based on the captured information about the transmission properties, wherein the captured information is used to select at least one radiation characteristic of one of the plurality of antenna unit for data transmission with a mobile terminal located in the predefined space, wherein the characterizing of the plurality of antenna units based on the information about the transmission properties comprises storing a piece of information about a radio channel property for the various radiation characteristics;
comparing stored information about the radio channel property for the various radiation characteristics with information captured during the repetition of the method about the transmission properties for the radiation characteristics;
ascertaining a piece of location information about an object situated in the predefined space via the comparison, wherein the predefined space is an interior of a transportation vehicle having multiple seats, wherein the object situated in the predefined space is a person in one of the seats, and wherein the location information is a piece of information about the occupancy of the seats in the transportation vehicle; and
using the information about the occupancy of the seats to locate the mobile terminal in the transportation vehicle.

2. The method of claim 1, wherein the first mode of operation is the sending mode of operation and wherein the second mode of operation is the receiving mode of operation, or wherein the second mode of operation is the sending mode of operation and wherein the first mode of operation is the receiving mode of operation.

3. The method of claim 1, wherein the second antenna unit has multiple radiation characteristics, and the method further comprises:
operating the second antenna unit in the first mode of operation;
operating the at least one first antenna unit in the second mode of operation;
varying the radiation characteristics of the second antenna unit; and
capturing information about transmission properties between the at least one first antenna unit and the second antenna unit about the radiation characteristics.

4. The method of claim 3, wherein the varying of the radiation characteristics comprises varying possible radiation characteristic of the second antenna unit, and the capturing of the information about the transmission properties between the at least one first antenna unit and the second antenna unit comprises capturing information about transmission properties for the possible radiation characteristic of the second antenna unit.

5. The method of claim 1, wherein each antenna unit of the plurality of antenna units comprises multiple antenna elements and the radiation characteristics comprise different beamforming modes with different main radiation directions.

6. The method of claim 1, wherein the varying of the radiation characteristics is effected with a time offset, wherein the varying of the radiation characteristics is effected with an offset in the frequency domain, and/or wherein the varying of the radiation characteristics is effected by different code identifiers.

7. The method of claim 1, wherein the varying of the radiation characteristics comprises varying possible radiation characteristics of the at least one first antenna unit, and the capturing of the information about the transmission properties between the at least one first antenna unit and the second antenna unit comprises capturing information about transmission properties for the possible radiation characteristics of the at least one first antenna unit.

8. A method for characterizing a plurality of antenna units in a predefined space, wherein the antenna units provide coverage with radio services for a mobile transceiver in the predefined space, wherein each antenna unit of the plurality of antenna units is operated in a sending mode and/or a receiving mode of operation, and wherein at least one first antenna unit of the plurality of antenna units has multiple radiation characteristics, the method comprising:
- operating the at least one first antenna unit in a first mode of operation;
- operating a second antenna unit in a second mode of operation;
- varying radiation characteristics of the at least one first antenna unit;
- capturing information about transmission properties between the at least one first antenna unit and the second antenna unit about the radiation characteristics;
- characterizing the at least one first and second antenna units based on the captured information about the transmission properties, wherein the captured information is used to select at least one radiation characteristic of one of the plurality of antenna unit for data transmission with a mobile terminal located in the predefined space, wherein the characterizing of the plurality of antenna units based on the information about the transmission properties comprises storing a piece of information about a radio channel property for the various radiation characteristics;
- comparing stored information about the radio channel property for the various radiation characteristics with information captured during the repetition of the method about the transmission properties for the radiation characteristics;
- ascertaining a piece of location information about an object situated in the predefined space via the comparison, wherein the predefined space is an interior of a transportation vehicle having multiple seats, wherein the object situated in the predefined space is a person in one of the seats, and wherein the location information is a piece of information about the occupancy of the seats in the transportation vehicle; and
- using the information about the occupancy of the seats to select a radiation characteristic of one of the plurality of antenna units for data transmission with the mobile terminal in the transportation vehicle.

9. The method of claim 8, wherein the first mode of operation is the sending mode of operation and wherein the second mode of operation is the receiving mode of operation, or wherein the second mode of operation is the sending mode of operation and wherein the first mode of operation is the receiving mode of operation.

10. The method of claim 8, wherein the second antenna unit has multiple radiation characteristics, and the method further comprises:
- operating the second antenna unit in the first mode of operation;
- operating the at least one first antenna unit in the second mode of operation;
- varying the radiation characteristics of the second antenna unit; and
- capturing information about transmission properties between the at least one first antenna unit and the second antenna unit about the radiation characteristics.

11. The method of claim 8, wherein each antenna unit of the plurality of antenna units comprises multiple antenna elements and the radiation characteristics comprise different beamforming modes with different main radiation directions.

12. The method of claim 11, wherein the varying of the radiation characteristics comprises varying possible radiation characteristic of the second antenna unit, and the capturing of the information about the transmission properties between the at least one first antenna unit and the second antenna unit comprises capturing information about transmission properties for the possible radiation characteristic of the second antenna unit.

13. The method of claim 8, wherein the varying of the radiation characteristics is effected with a time offset, wherein the varying of the radiation characteristics is effected with an offset in the frequency domain, and/or wherein the varying of the radiation characteristics is effected by different code identifiers.

14. The method of claim 8, wherein the varying of the radiation characteristics comprises varying possible radiation characteristics of the at least one first antenna unit, and the capturing of the information about the transmission properties between the at least one first antenna unit and the second antenna unit comprises capturing information about transmission properties for the possible radiation characteristics of the at least one first antenna unit.

15. An apparatus for characterizing a plurality of antenna units in a predefined space, wherein the antenna units provide coverage with radio services for a mobile transceiver in the predefined space, wherein each antenna unit of the plurality of antenna units are operated in a seconding mode and/or a receiving mode of operation, and wherein at least one first antenna unit has multiple radiation characteristics, the apparatus comprising:
- one or more interfaces for the plurality of antenna units;
- a control module for controlling the one or more interfaces, wherein the control module:
  - operates the at least one first antenna unit in a first mode of operation;
  - operates the second antenna unit in a second mode of operation;
  - varies the radiation characteristics of the at least one first antenna unit;
  - captures information about transmission properties between the at least one first antenna unit and the second antenna unit for the radiation characteristics; and
  - characterizes the at least one first and second antenna units based on the information about the transmission properties, wherein the captured information is used to select at least one radiation characteristic of one of the plurality of antenna unit for data transmission with a mobile terminal located in the predefined space, wherein the predefined space is an interior of a transportation vehicle having multiple seats, wherein the object situated in the predefined space is a person in one of the seats, and wherein the location information is a piece of information about the occupancy of the seats in the transportation vehicle,
- wherein the characterizing of the plurality of antenna units based on the information about the transmission properties comprises storing a piece of information about a radio channel property for the various radiation characteristics,
- wherein the control unit controls the apparatus to repeat the operations, compare stored information about the radio channel property for the various radiation characteristics with information captured during the repetition of the method about the transmission properties for the radiation characteristics, and ascertain a piece of location information about an object situated in the predefined space via the comparison, and wherein the information about the occupancy of the seats is used to locate a mobile terminal in the transportation vehicle.

16. The apparatus of claim 15, wherein the first mode of operation is the sending mode of operation and wherein the second mode of operation is the receiving mode of operation, or wherein the second mode of operation is the sending mode of operation and wherein the first mode of operation is the receiving mode of operation.

17. The apparatus of claim 15, wherein the second antenna unit has multiple radiation characteristics, wherein the control unit operates the second antenna unit in the first mode of operation, operates the at least one first antenna unit in the second mode of operation, varies the radiation characteristics of the second antenna unit, and captures information about transmission properties between the at least one first antenna unit and the second antenna unit about the radiation characteristics.

18. The apparatus of claim 17, wherein the varying of the radiation characteristics comprises using every possible radiation characteristic of the second antenna unit, and the capturing of the information about the transmission properties between the at least one first antenna unit and the second antenna unit comprises capturing information about transmission properties for every radiation characteristic of the second antenna unit.

19. The apparatus of claim 15, wherein each antenna unit of the plurality of antenna units comprises multiple antenna elements and the radiation characteristics comprise different beamforming modes with different main radiation directions.

20. The apparatus of claim 15, wherein the varying of the radiation characteristics is effected with a time offset, wherein the varying of the radiation characteristics is effected with an offset in the frequency domain, and/or wherein the varying of the radiation characteristics is effected by different code identifiers.

21. The apparatus of claim 15, wherein the varying of the radiation characteristics comprises using every possible radiation characteristic of the at least one first antenna unit, and the capturing of the information about the transmission properties between the at least one first antenna unit and the second antenna unit comprises capturing information about transmission properties for every radiation characteristic of the at least one first antenna unit.

22. The apparatus of claim 15, wherein the first mode of operation is the sending mode of operation and wherein the second mode of operation is the receiving mode of operation, or wherein the second mode of operation is the sending mode of operation and wherein the first mode of operation is the receiving mode of operation.

23. The apparatus of claim 15, wherein the second antenna unit has multiple radiation characteristics, and the method further comprises:
 operating the second antenna unit in the first mode of operation;
 operating the at least one first antenna unit in the second mode of operation;
 varying the radiation characteristics of the second antenna unit; and
 capturing information about transmission properties between the at least one first antenna unit and the second antenna unit about the radiation characteristics.

24. The apparatus of claim 23, wherein the varying of the radiation characteristics comprises varying possible radiation characteristic of the second antenna unit, and the capturing of the information about the transmission properties between the at least one first antenna unit and the second antenna unit comprises capturing information about transmission properties for the possible radiation characteristic of the second antenna unit.

25. The apparatus of claim 15, wherein each antenna unit of the plurality of antenna units comprises multiple antenna elements and the radiation characteristics comprise different beamforming modes with different main radiation directions.

26. The apparatus of claim 15, wherein the varying of the radiation characteristics is effected with a time offset, wherein the varying of the radiation characteristics is effected with an offset in the frequency domain, and/or wherein the varying of the radiation characteristics is effected by different code identifiers.

27. The apparatus of claim 15, wherein the varying of the radiation characteristics comprises varying possible radiation characteristics of the at least one first antenna unit, and the capturing of the information about the transmission properties between the at least one first antenna unit and the second antenna unit comprises capturing information about transmission properties for the possible radiation characteristics of the at least one first antenna unit.

28. An apparatus for characterizing a plurality of antenna units in a predefined space, wherein the antenna units provide coverage with radio services for a mobile transceiver in the predefined space, wherein each antenna unit of the plurality of antenna units are operated in a seconding mode and/or a receiving mode of operation, and wherein at least one first antenna unit has multiple radiation characteristics, the apparatus comprising:
 one or more interfaces for the plurality of antenna units;
 a control module for controlling the one or more interfaces, wherein the control module:
  operates the at least one first antenna unit in a first mode of operation;
  operates the second antenna unit in a second mode of operation;
  varies the radiation characteristics of the at least one first antenna unit;
  captures information about transmission properties between the at least one first antenna unit and the second antenna unit for the radiation characteristics; and
 characterizes the at least one first and second antenna units based on the information about the transmission properties, wherein the captured information is used to select at least one radiation characteristic of one of the plurality of antenna unit for data transmission with a mobile terminal located in the predefined space, wherein the predefined space is an interior of a transportation vehicle having multiple seats, wherein the object situated in the predefined space is a person in one of the seats, and wherein the location information is a piece of information about the occupancy of the seats in the transportation vehicle,
 wherein the characterizing of the plurality of antenna units based on the information about the transmission properties comprises storing a piece of information about a radio channel property for the various radiation characteristics,
 wherein the control unit controls the apparatus to repeat the operations, compare stored information about the radio channel property for the various radiation characteristics with information captured during the repetition of the method about the transmission properties for the radiation characteristics, and ascertain a piece of location information about an object situated in the predefined space via the comparison, wherein the information about the occupancy of the seats is used to select a radiation characteristic of one of the plurality of antenna units for data transmission with a mobile terminal in the transportation vehicle.

29. The apparatus of claim 28, wherein the first mode of operation is the sending mode of operation and wherein the second mode of operation is the receiving mode of operation, or wherein the second mode of operation is the sending mode of operation and wherein the first mode of operation is the receiving mode of operation.

30. The apparatus of claim 28, wherein the second antenna unit has multiple radiation characteristics, and the method further comprises:

operating the second antenna unit in the first mode of operation;

operating the at least one first antenna unit in the second mode of operation;

varying the radiation characteristics of the second antenna unit; and capturing information about transmission properties between the at least one first antenna unit and the second antenna unit about the radiation characteristics.

31. The apparatus of claim 30, wherein the varying of the radiation characteristics comprises varying possible radiation characteristic of the second antenna unit, and the capturing of the information about the transmission properties between the at least one first antenna unit and the second antenna unit comprises capturing information about transmission properties for the possible radiation characteristic of the second antenna unit.

32. The apparatus of claim 28, wherein each antenna unit of the plurality of antenna units comprises multiple antenna elements and the radiation characteristics comprise different beamforming modes with different main radiation directions.

33. The apparatus of claim 28, wherein the varying of the radiation characteristics is effected with a time offset, wherein the varying of the radiation characteristics is effected with an offset in the frequency domain, and/or wherein the varying of the radiation characteristics is effected by different code identifiers.

34. The apparatus of claim 28, wherein the varying of the radiation characteristics comprises varying possible radiation characteristics of the at least one first antenna unit, and the capturing of the information about the transmission properties between the at least one first antenna unit and the second antenna unit comprises capturing information about transmission properties for the possible radiation characteristics of the at least one first antenna unit.

35. A non-transitory computer readable medium including a computer program for performing a method for characterizing a plurality of antenna units in a predefined space, wherein the plurality of antenna units provide coverage with radio services for a mobile transceiver in the predefined space, wherein each antenna unit of the plurality of antenna units is operated in a sending mode and/or a receiving mode of operation, and wherein at least one first antenna unit of the plurality of antenna units has multiple radiation characteristics, when the computer program runs on a computer, a processor or a programmable hardware component, the method comprising:

operating the at least one first antenna unit in a first mode of operation;

operating a second antenna unit in a second mode of operation;

varying radiation characteristics of the at least one first antenna unit;

capturing information about transmission properties between the at least one first antenna unit and the second antenna unit about the radiation characteristics;

characterizing the at least one first and second antenna units based on the captured information about the transmission properties, wherein the captured information is used to select at least one radiation characteristic of one of the plurality of antenna unit for data transmission with a mobile terminal located in the predefined space, wherein the characterizing of the plurality of antenna units based on the information about the transmission properties comprises storing a piece of information about a radio channel property for the various radiation characteristics;

comparing stored information about the radio channel property for the various radiation characteristics with information captured during the repetition of the method about the transmission properties for the radiation characteristics;

ascertaining a piece of location information about an object situated in the predefined space via the comparison, wherein the predefined space is an interior of a transportation vehicle having multiple seats, wherein the object situated in the predefined space is a person in one of the seats, and wherein the location information is a piece of information about the occupancy of the seats in the transportation vehicle; and using the information about the occupancy of the seats to locate the mobile terminal in the transportation vehicle.

36. The non-transitory computer readable medium of claim 35, wherein the first mode of operation is the sending mode of operation and wherein the second mode of operation is the receiving mode of operation, or wherein the second mode of operation is the sending mode of operation and wherein the first mode of operation is the receiving mode of operation.

37. The non-transitory computer readable medium of claim 35, wherein the second antenna unit has multiple radiation characteristics, and the method further comprises:

operating the second antenna unit in the first mode of operation;

operating the at least one first antenna unit in the second mode of operation;

varying the radiation characteristics of the second antenna unit; and capturing information about transmission properties between the at least one first antenna unit and the second antenna unit about the radiation characteristics.

38. The method of claim 37, wherein the varying of the radiation characteristics comprises varying possible radiation characteristic of the second antenna unit, and the capturing of the information about the transmission properties between the at least one first antenna unit and the second antenna unit comprises capturing information about transmission properties for the possible radiation characteristic of the second antenna unit.

39. The non-transitory computer readable medium of claim 35, wherein each antenna unit of the plurality of antenna units comprises multiple antenna elements and the radiation characteristics comprise different beamforming modes with different main radiation directions.

40. The non-transitory computer readable medium of claim 35, wherein the varying of the radiation characteristics is effected with a time offset, wherein the varying of the radiation characteristics is effected with an offset in the frequency domain, and/or wherein the varying of the radiation characteristics is effected by different code identifiers.

41. The non-transitory computer readable medium of claim 35, wherein the varying of the radiation characteristics comprises varying possible radiation characteristics of the at least one first antenna unit, and the capturing of the information about the transmission properties between the at least one first antenna unit and the second antenna unit comprises capturing information about transmission properties for the possible radiation characteristics of the at least one first antenna unit.

42. A non-transitory computer readable medium including a computer program for performing a method for characterizing a plurality of antenna units in a predefined space, wherein the plurality of antenna units provide coverage with radio services for a mobile transceiver in the predefined space, wherein each antenna unit of the plurality of antenna units is operated in a sending mode and/or a receiving mode of operation, and wherein at least one first antenna unit of the plurality of antenna units has multiple radiation characteristics, when the computer program runs on a computer, a processor or a programmable hardware component, the method comprising:
  operating the at least one first antenna unit in a first mode of operation;
  operating a second antenna unit in a second mode of operation;
  varying radiation characteristics of the at least one first antenna unit;
  capturing information about transmission properties between the at least one first antenna unit and the second antenna unit about the radiation characteristics;
  characterizing the at least one first and second antenna units based on the captured information about the transmission properties, wherein the captured information is used to select at least one radiation characteristic of one of the plurality of antenna unit for data transmission with a mobile terminal located in the predefined space, wherein the characterizing of the plurality of antenna units based on the information about the transmission properties comprises storing a piece of information about a radio channel property for the various radiation characteristics;
  comparing stored information about the radio channel property for the various radiation characteristics with information captured during the repetition of the method about the transmission properties for the radiation characteristics;
  ascertaining a piece of location information about an object situated in the predefined space via the comparison, wherein the predefined space is an interior of a transportation vehicle having multiple seats, wherein the object situated in the predefined space is a person in one of the seats, and wherein the location information is a piece of information about the occupancy of the seats in the transportation vehicle; and
  using the information about the occupancy of the seats to select a radiation characteristic of one of the plurality of antenna units for data transmission with the mobile terminal in the transportation vehicle.

43. The non-transitory computer readable medium of claim 42, wherein the first mode of operation is the sending mode of operation and wherein the second mode of operation is the receiving mode of operation, or wherein the second mode of operation is the sending mode of operation and wherein the first mode of operation is the receiving mode of operation.

44. The non-transitory computer readable medium of claim 42, wherein the second antenna unit has multiple radiation characteristics, and the method further comprises:
  operating the second antenna unit in the first mode of operation;
  operating the at least one first antenna unit in the second mode of operation;
  varying the radiation characteristics of the second antenna unit; and
  capturing information about transmission properties between the at least one first antenna unit and the second antenna unit about the radiation characteristics.

45. The method of claim 44, wherein the varying of the radiation characteristics comprises varying possible radiation characteristic of the second antenna unit, and the capturing of the information about the transmission properties between the at least one first antenna unit and the second antenna unit comprises capturing information about transmission properties for the possible radiation characteristic of the second antenna unit.

46. The non-transitory computer readable medium of claim 42, wherein each antenna unit of the plurality of antenna units comprises multiple antenna elements and the radiation characteristics comprise different beamforming modes with different main radiation directions.

47. The non-transitory computer readable medium of claim 42, wherein the varying of the radiation characteristics is effected with a time offset, wherein the varying of the radiation characteristics is effected with an offset in the frequency domain, and/or wherein the varying of the radiation characteristics is effected by different code identifiers.

48. The non-transitory computer readable medium of claim 42, wherein the varying of the radiation characteristics comprises varying possible radiation characteristics of the at least one first antenna unit, and the capturing of the information about the transmission properties between the at least one first antenna unit and the second antenna unit comprises capturing information about transmission properties for the possible radiation characteristics of the at least one first antenna unit.

* * * * *